(12) United States Patent
Rezvani

(10) Patent No.: US 10,411,341 B2
(45) Date of Patent: Sep. 10, 2019

(54) INDOOR ANTENNA SYSTEM AND METHOD OF OPERATION

(71) Applicant: Behrooz Rezvani, San Ramon, CA (US)

(72) Inventor: Behrooz Rezvani, San Ramon, CA (US)

(*) Notice: Subject to any disclaimer, the term of this patent is extended or adjusted under 35 U.S.C. 154(b) by 216 days.

(21) Appl. No.: 15/663,613

(22) Filed: Jul. 28, 2017

(65) Prior Publication Data
US 2018/0034150 A1 Feb. 1, 2018

Related U.S. Application Data

(60) Provisional application No. 62/368,149, filed on Jul. 28, 2016, provisional application No. 62/474,524, filed on Mar. 21, 2017.

(51) Int. Cl.
| | |
|---|---|
| *H01Q 3/08* | (2006.01) |
| *H01Q 19/19* | (2006.01) |
| *H04N 21/61* | (2011.01) |
| *H01Q 3/26* | (2006.01) |
| *H01Q 21/24* | (2006.01) |
| *H01Q 21/28* | (2006.01) |
| *H01Q 25/00* | (2006.01) |

(52) U.S. Cl.
CPC ............ *H01Q 3/08* (2013.01); *H01Q 3/2605* (2013.01); *H01Q 19/19* (2013.01); *H01Q 21/245* (2013.01); *H01Q 21/28* (2013.01); *H01Q 25/001* (2013.01); *H04N 21/6143* (2013.01)

(58) Field of Classification Search
CPC ........ H01Q 3/08; H01Q 21/28; H01Q 3/2605; H01Q 25/001; H01Q 21/245; H01Q 19/19
See application file for complete search history.

(56) References Cited

U.S. PATENT DOCUMENTS

| | | | |
|---|---|---|---|
| 2009/0225658 A1* | 9/2009 | Rezvani | H04L 45/00 370/241 |
| 2013/0227619 A1* | 8/2013 | Lewis | H01Q 1/007 725/81 |
| 2014/0022131 A1* | 1/2014 | Azulay | H01Q 1/007 343/727 |

* cited by examiner

*Primary Examiner* — Hai V Tran

(57) ABSTRACT

An indoor antenna system comprises one or more antenna modules. Each antenna module comprises an antenna array configured to receive an input signal and generate a plurality of outputs, a selector that selects a subset of the plurality of outputs, and a converter that converts the subset of the plurality of outputs into a set of digital streams. The antenna system further includes a processor that receives and analyzes outputs from the one or more antenna modules and generates an output signal corresponding to the input signal, and a controller that controls states of the one or more antenna modules. Each antenna module is configurable to be in any of a plurality of states to receive the incoming signal. The controller is configured to cause the state of each antenna module to change.

20 Claims, 15 Drawing Sheets

INDOOR ANTENNA SYSTEM AND METHOD OF OPERATION

CROSS REFERENCE TO RELATED APPLICATIONS

The present application claims priority to U.S. Provisional Patent Application No. 62/368,149, filed Jul. 28, 2016, and U.S. Provisional Patent Application No. 62/474,524, filed Mar. 21, 2017, each of which is incorporated herein by reference in its entirety.

FIELD

The present application is related generally to antenna systems, and more particularly to an indoor antenna system and method of operation.

BACKGROUND

Currently, TV satellite systems use standard antennas such as the Digital Video Broadcasting-Satellite (DVB-S), and DVB-S2 for second generation, or the like, which are approved by governing bodies such as the European Telecommunications Standards Institute (ETSI). FIG. 1 is a representative diagram of a typical wireless DVB-S or DVB-S2 antenna with a Quadrature Amplitude Modulation (QAM) type decoder. It includes a parabolic dish installed on a roof-top, along with some electronics such as an LNA, a block-down-converter, an analog to digital converter (ADC), followed by a baseband receiver, as shown in FIG. 1. Other types of wireless receivers also could benefit from this approach, such as 5G WiFi receivers that use Orthogonal Frequency Division Multiplexing (OFDM) type modulation. A typical TV dish antenna has a gain of about 35 dB to 45 dB. There are some examples of high gain microstrip antennas (see reference 2) that are about 25 dB to 30 dB.

The major disadvantages of such antenna systems is the need for installing the parabolic metallic antennas (also known as dish antennas) on the roof-tops. These dish antennas have extremely sharp beamwidth, which needs to get pointed to a specific geo-stationary satellites in the sky. This procedure is fairly lengthy and it can take 2-3 hours of installation by an expert technician. Another disadvantage is that some people don't prefer a dish antenna to appear on their roofs as it can create an architectural anomaly to their house.

DESCRIPTION OF THE EMBODIMENTS

Figure 1:
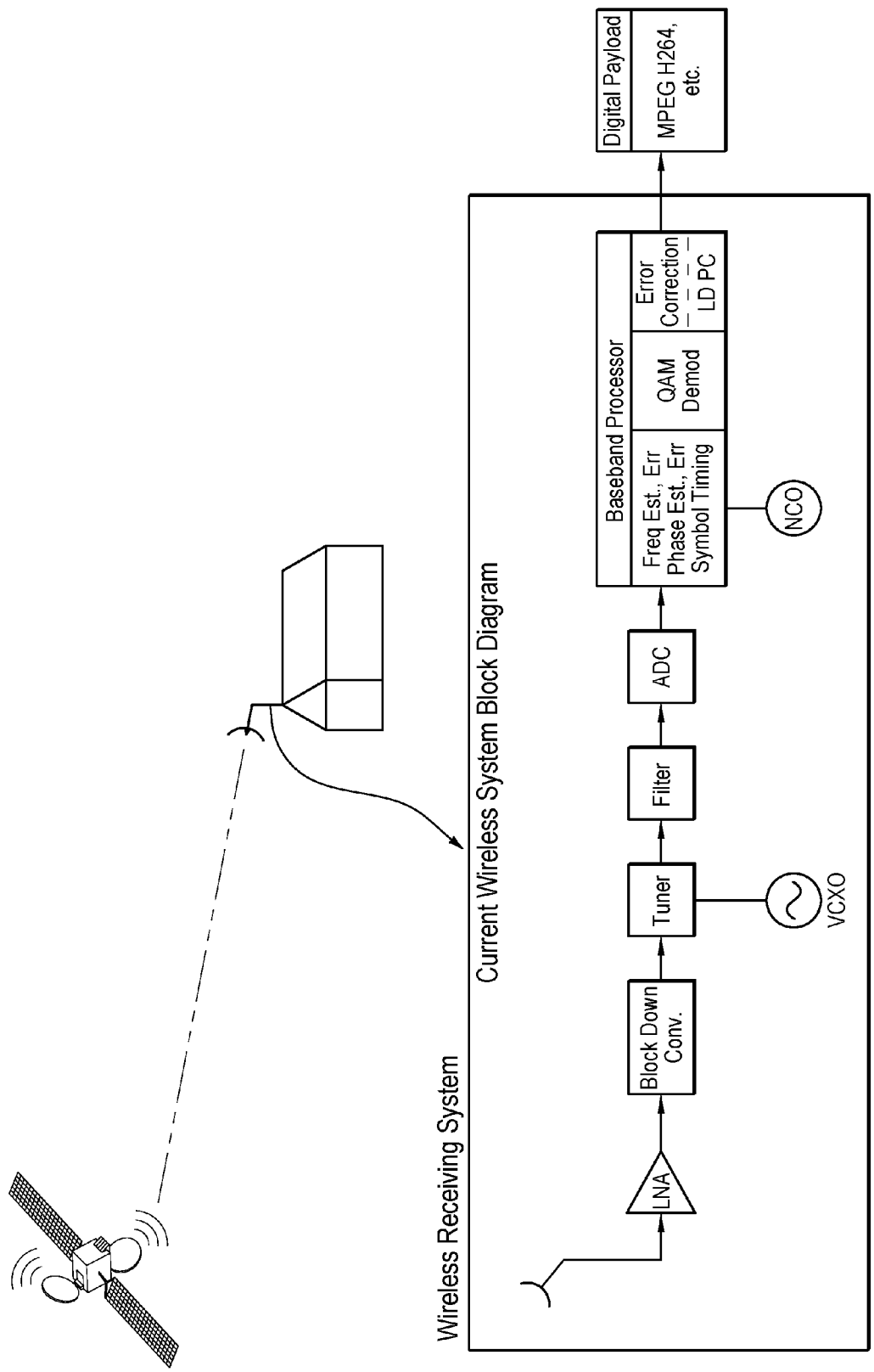
FIG. 1 is a representative diagram of a conventional satellite receiver system.
Figure 2:
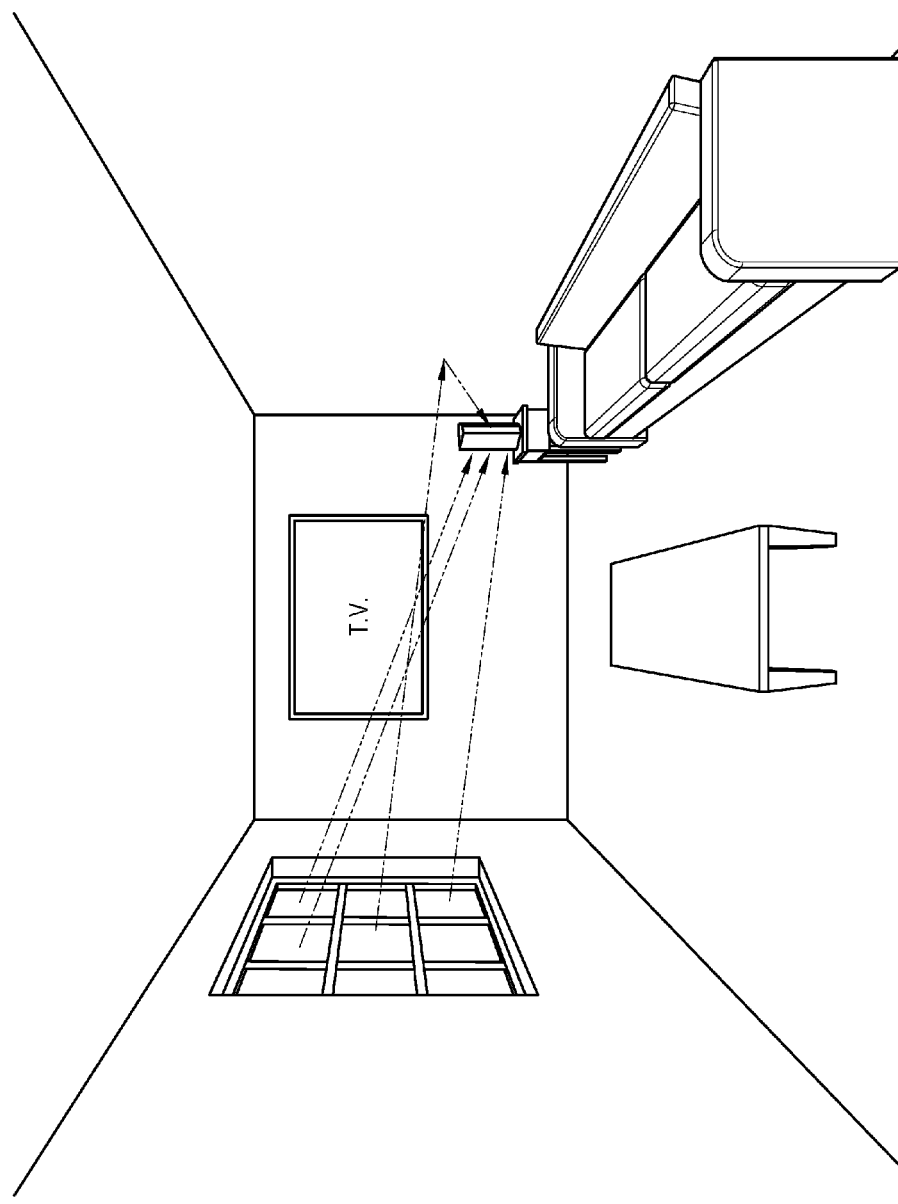
FIG. 2 is a diagram of a placement of an antenna system in the shape of a 3-D object inside a room according to certain embodiments.

The present application presents a novel indoor receiving antenna system capable of being seamlessly integrated with indoor decoration and furniture. An exemplary configuration of an antenna system according to certain embodiments is shown in FIG. 2. As shown, RF/microwave signals from a satellite can enter a room through a window and then get scattered. Some of the signals eventually hit a receiving antenna in the shape of a cylindrical decoration.

Figure 3:
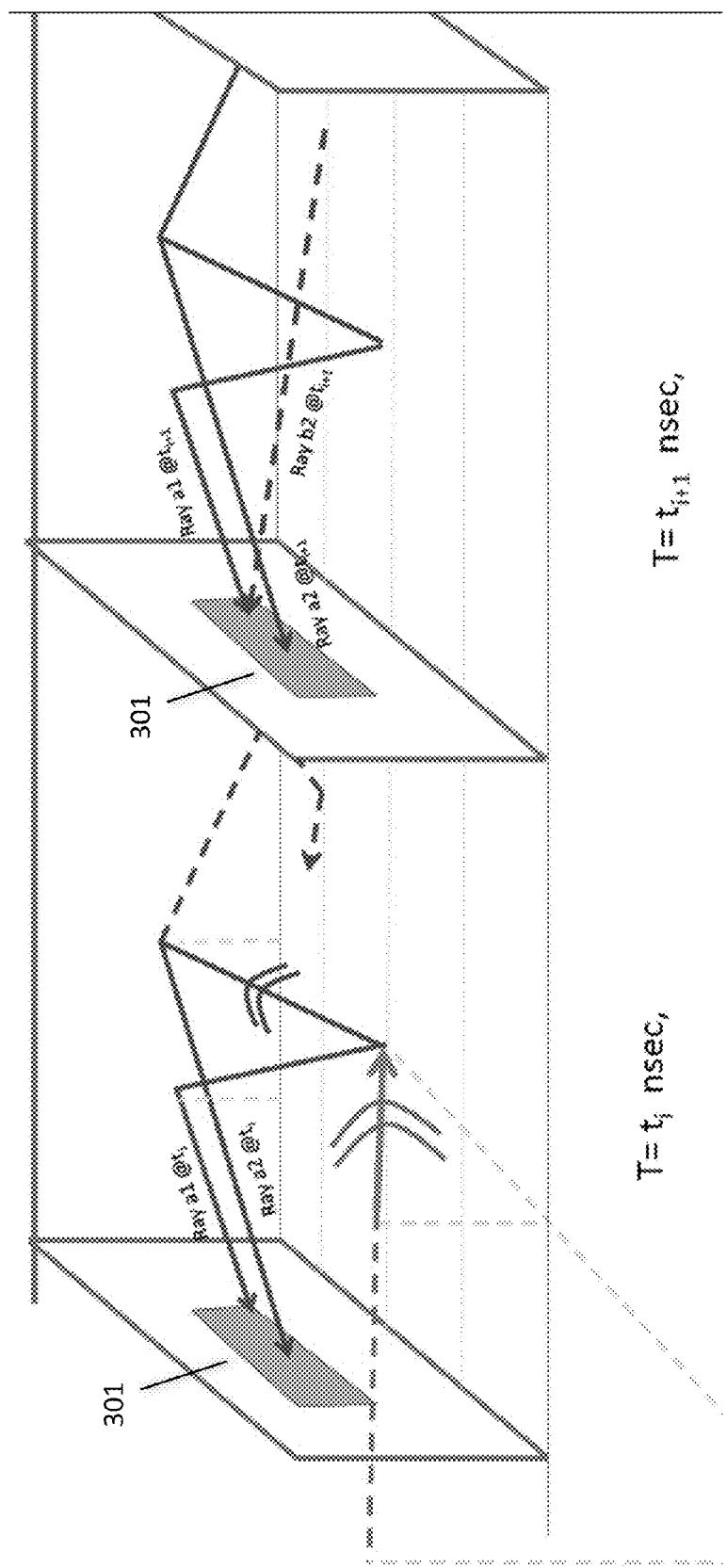
FIG. 3 is a representative diagram illustrating wave propagation inside a room and an indoor antenna system having a plurality of antenna modules each in the shape of a flat panel according to certain embodiments.

FIG. 3 is a representative diagram illustrating wave propagation inside a room and an indoor antenna system having a plurality of antenna modules 301 each in the shape of a flat panel according to certain embodiments. In a room setting after the incident wave from, for example, a satellite, hits various objects inside a room, the main beam (energy vector) will break off into smaller sub-beams (smaller vectors or sub-vectors, in the drawing they are identified). In other words, one can assume that the angle of departure (AoD) of these sub-vectors are random (from the first impact to a reflective surface . . . right after reflection). As a result, one or more of these sub-vectors would eventually hit an antenna module.

Thus, the angle of arrival of (AoA) of each of these sub-vectors with respect to the indoor antenna modules is considered to be random. Each antenna module may see the same signal but delayed in time and changed in magnitude. Given the symbol period is fairly small—for example 30 nsec, the symbols are expected to interfere with each other. In the literature this is known as ISI or Inter-Symbol interference.

Furthermore, while the signal propagating from the satellite is a highly coherent microwave signal, once it gets inside the building/house through a window or otherwise, the signal gets scattered. The scattered waves now have lost a lot of their energy and, in some cases, their magnitude is probably below thermal noise floor.

Figure 4A:
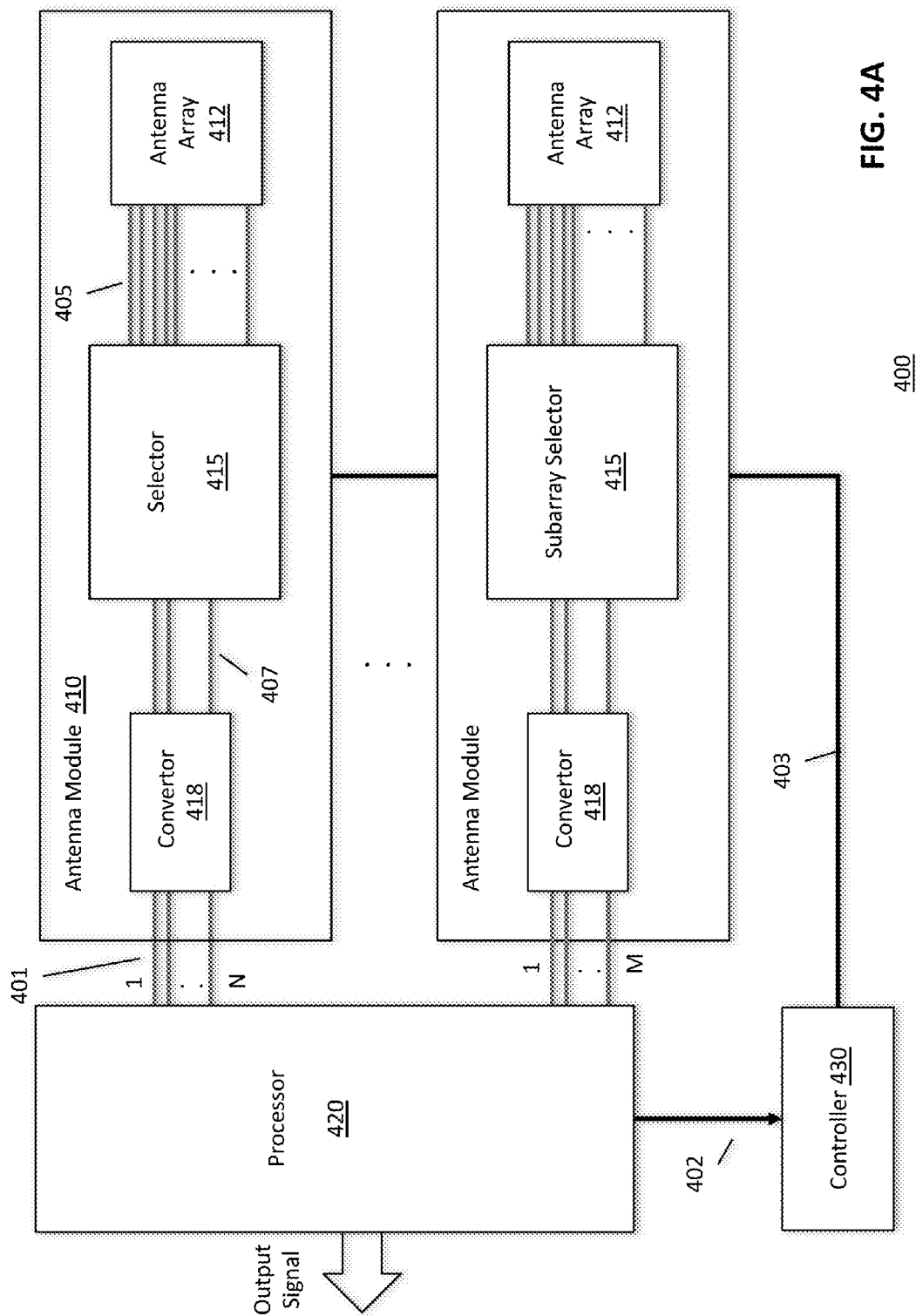
FIG. 4A is a block diagram of an antenna system according to certain embodiments.

In certain embodiments, as shown in FIG. 4A, an indoor antenna system 400 is designed to receive satellite TV signals in a room by actually taking advantage of this scattered nature of indoor signals. As shown in FIG. 4A, the antenna system 400 includes one or more antenna modules 410 that respond to an incident RF signal by outputting one or more sets of digital streams 401, a processor 420 that receives and analyzes the digital streams 401 from the one or more antenna modules and generates an output signal corresponding to the incident RF signal, and a controller 430 that provides control signals 403 that vary over time and output the control signals to the one or more antenna modules 410. Each antenna module 410 includes an antenna array 412 configurable by one or more of the control signals 403 to have a particular polarity of a plurality of polarities at a given time. The antenna array is thus configured to react to a signal impinged thereon by generating a plurality of outputs with the particular polarity. The each antenna module 410 further comprises a selector 415 to select a particular subset of the plurality of outputs at a given time, and the selection is time dependant based on the control signals 403. The each antenna module 410 further includes a converter 418 that converts the selected subset of the plurality of outputs from the selector 415 into a set of digital streams 401.

In certain embodiments, an antenna module 410 can have a planar shape and forms a panel that can be hung or installed on a wall covered with a picture or a painting, at a place with good signal visibility in a case when wireless signals enter the room from outdoors. The discussions below, however, are also applicable to antenna modules of other shapes or geometries different from a flat panel, such as, for example, a 3D object like furniture inside a room, as shown in FIG. 2.

Figure 4B:
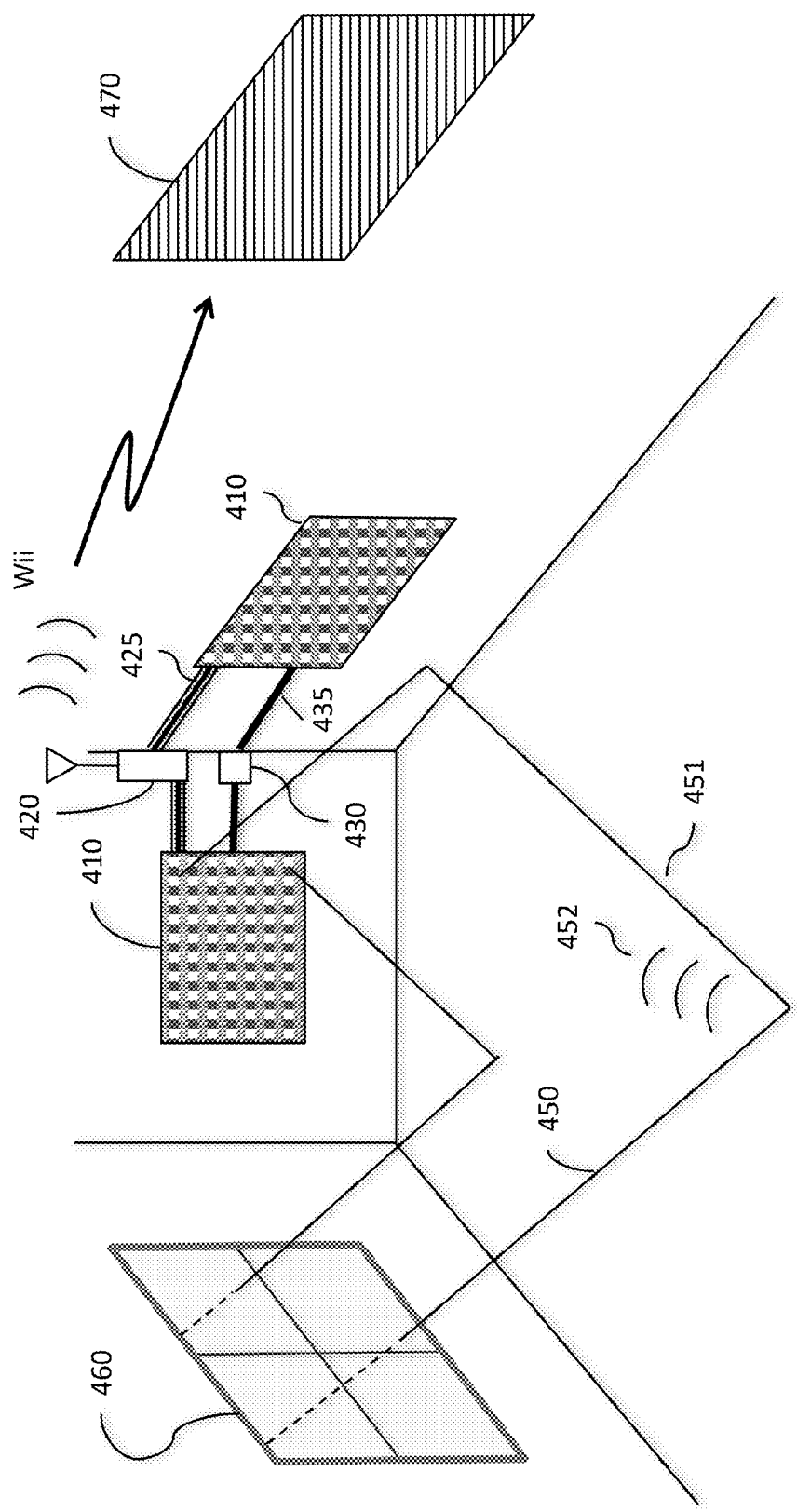
FIG. 4B is a representative diagram illustrating an example of distributed antenna modules in the antenna system.

Thus, the antenna system 400 can comprise a plurality of antenna modules, according to certain embodiments. The antenna system 400 need not be on a single physical platform. For example, two flat panels can be placed on two different walls in a house to form an antenna system, as shown in FIG. 4B. The communication between each antenna module 410 and other components of the system 400 can be through electrical wiring or wireless using, for example, high-speed wireless or optical connection. For example, the antenna modules 410 can be coupled to the processor 420 via, for example, signal cables 425, and to the controller 430 via, for example, control signal wires 435. The sizes and types of the Antenna Modules need not to be identical. Different sized or shaped antenna modules, such as rectangular, square and cylindrical types of Antenna Modules with different capabilities can form one physical structure or separate physical structures.

As shown in FIG. 4B, incident rays of an incoming signal 450 from, for example, a satellite can enter a room through, for example, a window 460, and hit the walls, floors or other objects of the room, resulting in reflection, refraction, once or multiple times, before reaching the antenna modules 410 as input signals. The output signal from the processor 420, i.e., the digital payload may consist of MPEG or H.264 video streams that can be transmitted to a TV receiver 470 via a signal cable or by WiFi transmission in the same room or another room.

Figure 5:
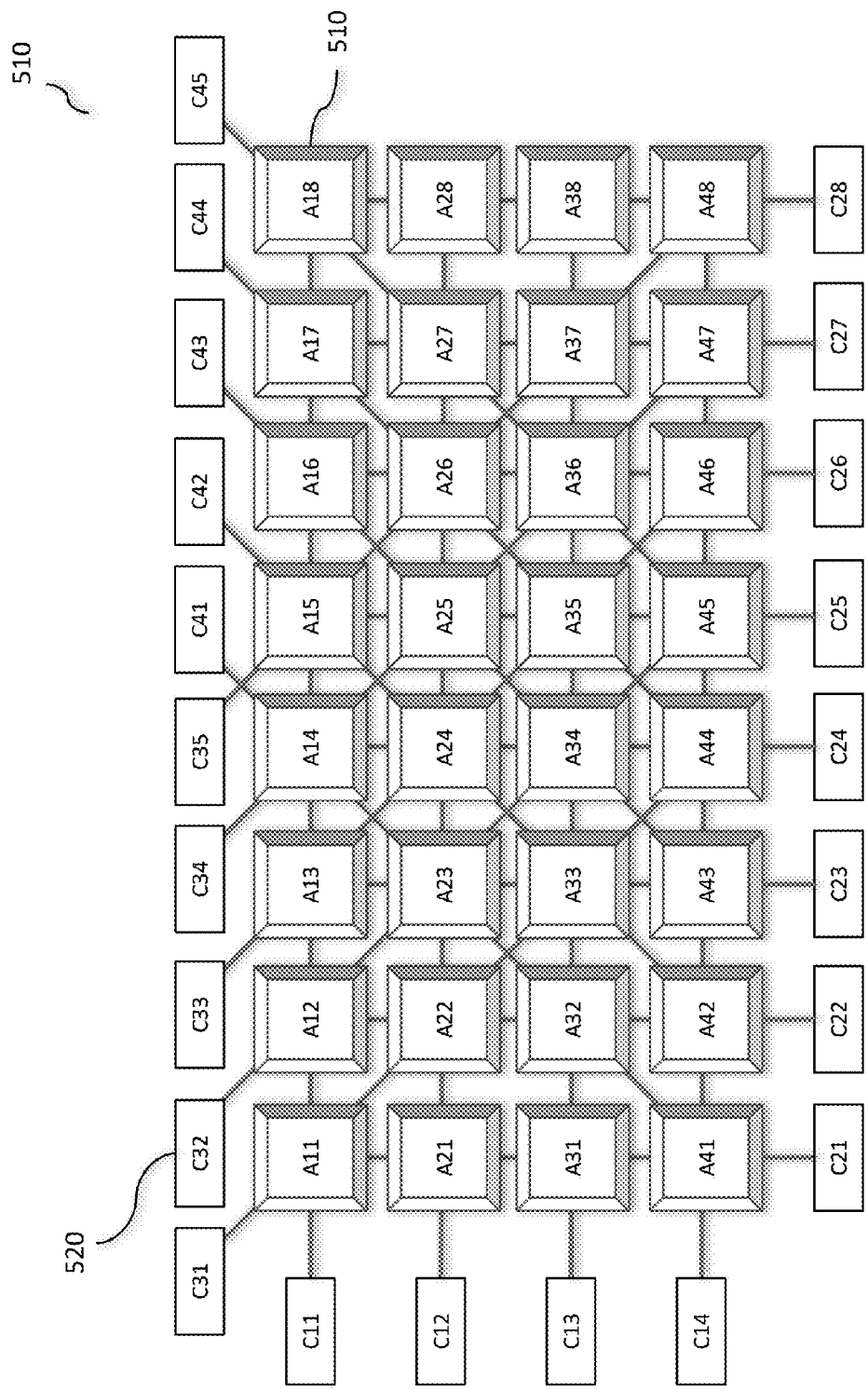
FIG. 5 is a representative diagram of an antenna array according to certain embodiments.

FIG. 5 is a representative diagram of an antenna array 410 according to certain embodiments. As shown in FIG. 5, the antenna array 410 includes an array of antenna elements 510 and a plurality of combiners 520 each coupled to a respective subarray of antenna elements. For example, combiner C11 is coupled to a first subarray formed by antenna elements A11, A12, A13, . . . , A18; combiner C25 is coupled to a second subarray formed by antenna elements A15, A25, A35, and A45; combiner C32 is coupled to a third subarray formed by antenna elements A23, A34, A45, and A56; combiner C45 is coupled to a fourth subarray formed by antenna elements A18, A27, A36, and A45, and so on.

Figure 6:
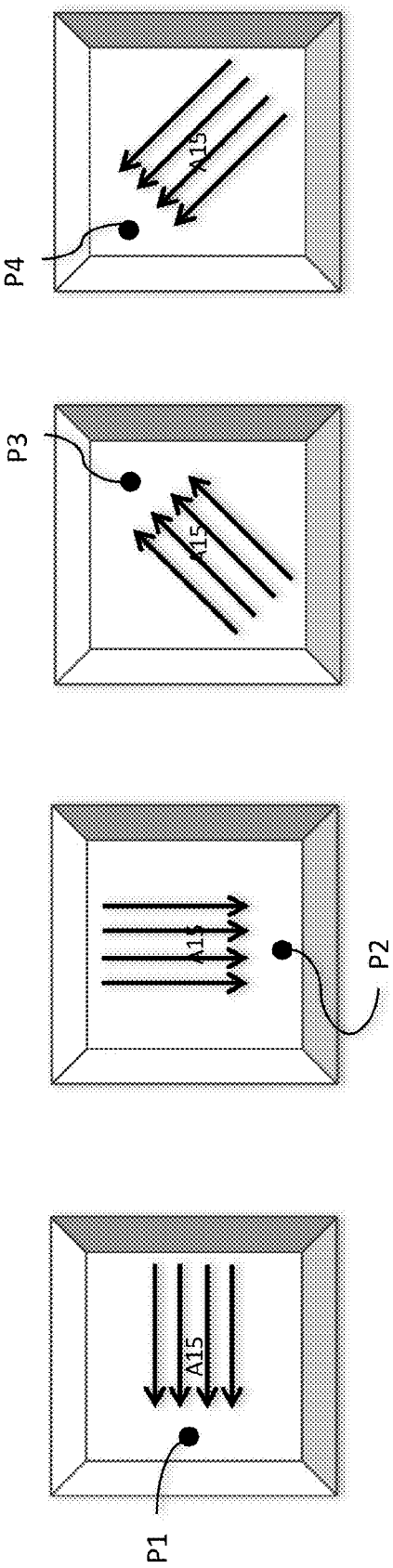
FIG. 6 is representative diagram illustrating different current distribution resulting in different polarities for an antenna array element according to certain embodiments.
Figure 7:
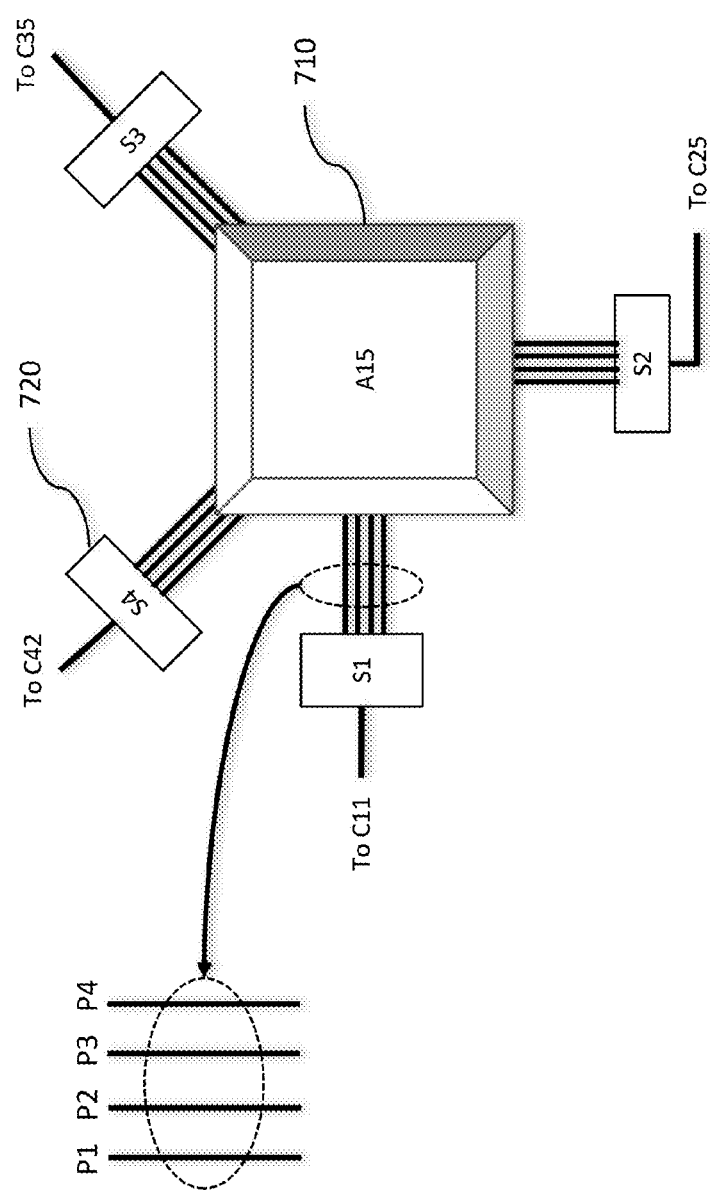
FIG. 7 is a representative diagram illustrating coupling between an antenna array element and each of a plurality of combiners according to certain embodiments.

As shown in FIG. 6, each antenna element (e.g., antenna element A15) in the array of antenna elements is capable of providing an output (e.g., P1, P2, P3, or P4) with any of a plurality of polarities. As shown in FIG. 7, each antenna element (e.g., antenna element A15) includes an antenna patch 710 and a plurality of switches 720 (e.g., switches S1, S2, and S3). Each respective switch (e.g., switch S3) receives the outputs (e.g., P1, P2, P3, and P4) corresponding to the plurality of polarities and selects an output with a particular polarity to provide to a respective combiner (e.g., C35) of a plurality of combiners (e.g., C11, C25, C35, and C42), to which the each antenna element (e.g., A15) is coupled. Note that the shape of the array patch 710 can be square, circular, hexonal, etc., depending on specific design and performance requirements.

Figure 8:
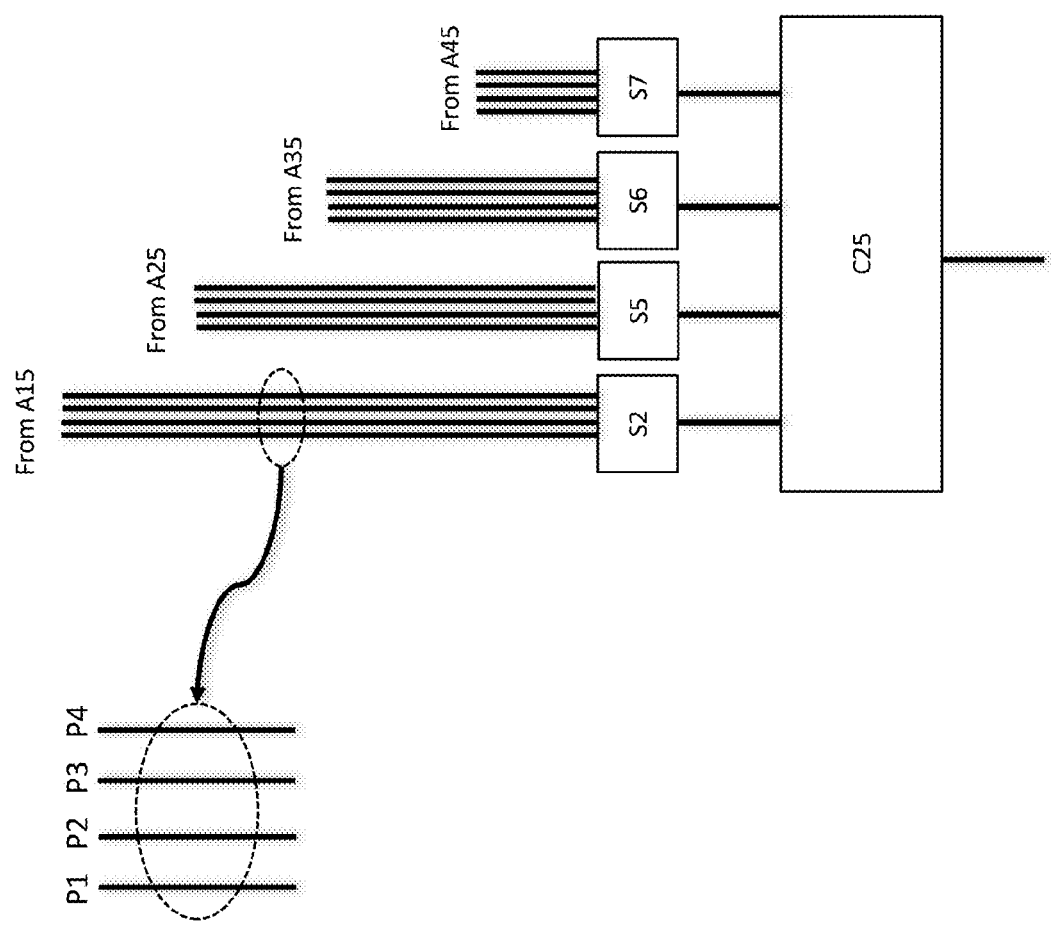
FIG. 8 is a representative diagram illustrating coupling between a combiner and array elements in a respective subarray according to certain embodiments.

In certain embodiments, each respective combiner of the plurality of combiners is configured to combine outputs from a respective subarray in the array of antenna elements. As shown in FIG. 8, each combiner (e.g., combine C25) is coupled to one or more antenna elements (e.g., antenna elements A15, A25, A35, and A45) in a corresponding subarray (e.g., the second subarray formed by the antenna elements A15, A25, A35, and A45) via one or more switches (e.g., switches S2, S5, S6, and S7), and is configured to combine outputs from the one or more switches to generate an output for the subarray.

Figure 9:
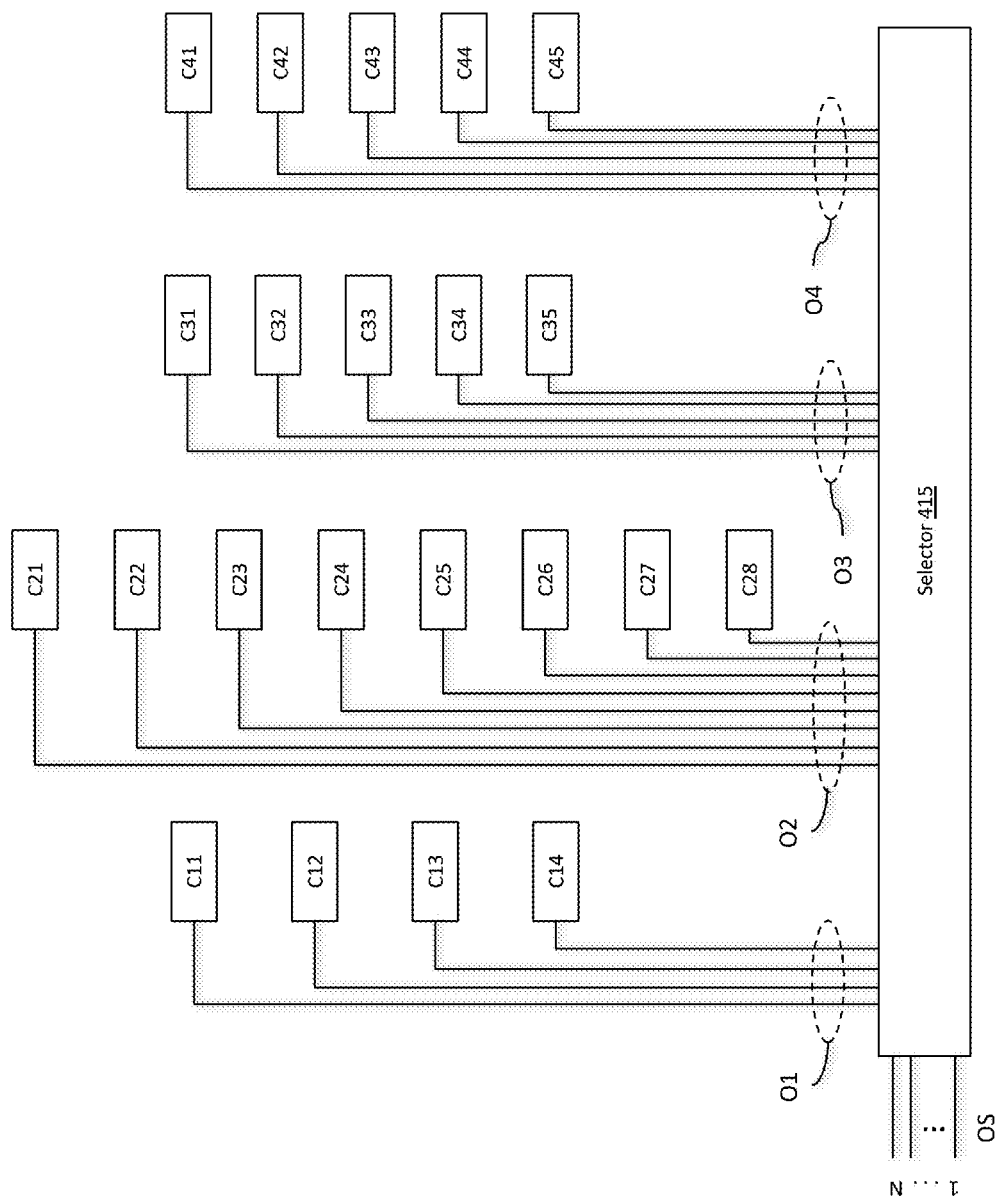
FIG. 9 is representative diagram illustrating selection of a subarray according to certain embodiments.

As shown in FIG. 9, the subarrays form groups based on certain common characteristic(s). For example, a first group of subarrays coupled a first set of combiners C11, C12, C13 and C14 share the common characteristic that each subarray in the first group of subarrays is arranged in a horizontal subarray direction, a second group of subarrays coupled a second set of combiners C21, C22, C23, C24, C25, C26, C27 and C28 share the common characteristic that each subarray in the second group of subarrays is arranged in a vertical subarray direction, a third group of subarrays coupled a third set of combiners C31, C32, C33, C34 and C35 share the common characteristic that each subarray in the third group of subarrays is arranged in a first diagonal subarray direction, and a fourth group of subarrays coupled a fourth set of combiners C41, C42, C43, C44 and C45 share the common characteristic that each subarray in the fourth group of subarrays is arranged in a second diagonal subarray direction. The O1, O2, O3, and O4 outputs from the first, second, third and fourth subarrays, respectively, are provided to the selector 415, which selects O1, O2, O3, or O4 as outputs OS for providing to the converter 418. Depending on which group of subarray is selected, the number of the outputs from the selector 415, and thus the number of signal streams from the antenna module 410 can be different. Note that the antenna elements of a subarray when that subarray is selected all have the same polarity.

In certain embodiments, different number of states may be scanned depending on the array structure of Antenna Module. In the above example, 16 different states can be formed. In certain embodiments, a minimum of 4 of 6 possible polarization types are supported by an antenna module. The six possible polarization types are: Linear Polarization {Horizontal, Vertical, +45 degrees, −45 degrees} and Circular or almost Circular {Left Hand Circular Polarization LHCP, Right Hand Circular Polarization} In terms of number of subarrays, there should be a minimum of 4 subarrays according to certain embodiments.

When the Antenna Module is too small (8 Antenna Elements or lower) to form large enough subarrays, each antenna element can be digitized individually, and all 6 polarization states can be used. So in that scenario, an antenna modules should be configured to support all 6 states of polarization.

Although FIGS. 5 and 9 show that the subarrays are grouped based on subarray directions, other ways of grouping the subarrays can also be used depending on particular applications. Subarrays can be formed in the shape of linear arrays as shown in the FIG. 5, or they can be in the form of small square or small rectangle or other geometrical shapes. The smallest subarray size is one antenna element. This basically means each antenna element has its own dedicated receive path and the signals go thru ADC as well. The technique gives the most flexibility—but there are other practical implementation issues. For example, the cost of RF/IF silicon IC would be multiplied. The processing time for process the outputs from the subarrays also grows much longer, and as such processing speed might have to be 5× or 10× higher. If the SNR is very low—that might also cause additional problem.

In certain embodiments, each antenna module 410 is configurable to be in any of a plurality of states in which to react to the incident signal, each respective state of the plurality of states corresponding to a respective polarity of the plurality of polarities and a respective subset of one or more combiners (or respective group of subarrays) selected to provide the outputs OS associated with the respective polarity to the converter.

As discussed above, it is assumed that once a signal enters a house, there are significant losses of signal energy and signal coherency due to the multipath nature of indoor channels. There are also losses of circular polarization and polarization isolation between two simultaneous data streams over the same frequency bands with opposite circular polarizations.

Presented herein is a novel approach to counteract the above losses by considering the antenna module(s) and the room as a single 3-dimensional (3D) electromagnetic structure, so they behave together like a lossy resonator. In this 3D structure, a large fluctuation of energy density is expected. For example, assuming that the average energy density of a desired signal in the room is about −130 dBW/m$^2$, areas in 3D spatial position in the room that has much higher energy density due constructive summing/bunching of energy from multiple beams/rays can be found, and areas that has lower energy density due destructive addition of signals can be avoided.

Having that understanding about the channel characteristic model, the antenna system is designed to seek and rank the energy profile of the incoming signal in the 3D indoor space and assign maximum antenna gain, with proper polarization and signal sampling in those areas during one of multiple symbol periods. If the channel is non-stationary, this process can be repeated over every symbol or multiple symbol periods. This allows maximum energy collection of desired signal while removing the interfering signals.

A symbol period is a well-known concept in the field of communications, and it is a unit of time when a quanta of information is transmitted. Typically, there two types of symbols, QAM based (very short time period) or OFDM based (very long time period). Each type offers its own unique advantages in dealing with multipath wave propagation. The proposal here works equally well on both types of modulations. The underlying time consideration however is driven in part by physical properties of wave propagation in an indoor environment, as well as the signal bandwidth of interests.

Figure 10:
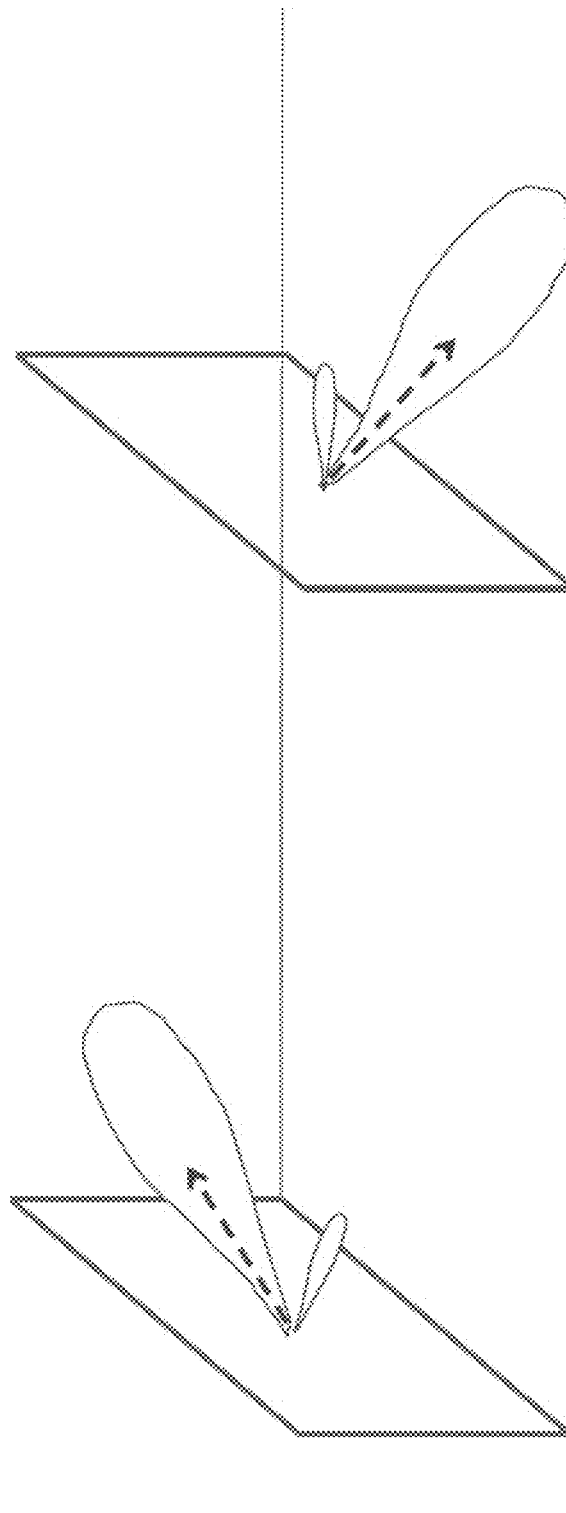
FIG. 10 is a representative diagram illustrating capability of a 2D array antenna module that allows selection of a narrow beamwidth gain (from one of the subarrays) in a particular direction with certain polarity at one instant of time, and then selection of another beam with another polarity in the next instant of time to achieve increased spatial diversity for optimization of signal recovery and SNR improvement as a function of angle of arrival (AoA) according to certain embodiments.

In certain embodiments, as shown in FIG. 10, the antenna system 400 uses Space-Time, and Polarization Sampling by employing various antenna modules that shift their states to scan for maximum amount of energy (or hot spots). This sampling happens in spatial domain. Furthermore, due to effect of various variables effecting multipath components there could be different characteristics of hot spots energy, polarization, and mixture of interfering components in time and frequency domain. The results of such samplings would give an effective signal processing gain. For example if during one symbol period, significant processing gain of about 10 Log 10(500)~27 dB potentially can be produced by methods such MRC (Maximal Ratio Combining or Optimal Combining).

Figure 11:
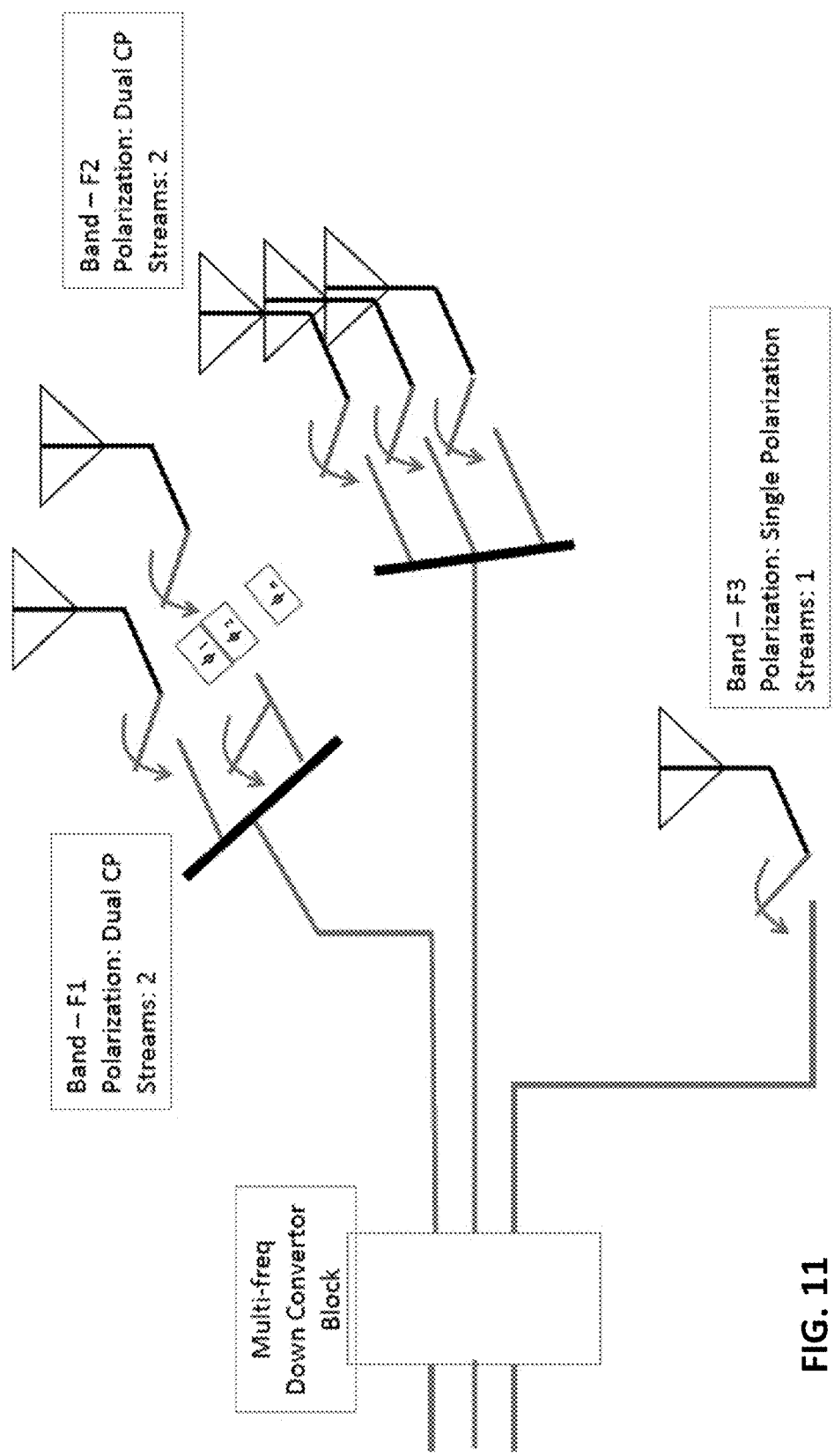
FIG. 11 is a representative diagram illustrating a process for multi-frequency dynamic/adaptive beam-steering/antenna selection according to certain embodiments.

Therefore, as shown in FIG. 11, the antenna system 400 may employ a process of multi-frequency dynamic/adaptive beam-steering/antenna selection according to certain embodiments. For example, the process may include:
1. determining multiple directions of interests in a 3D space (k) with sufficient energy (or clusters or hot spots); and
2. allocating/selecting sufficient number of subarrays for each direction k, such that the overall SNR of the received signal is optimized The group of n subarrays will form a gain pattern ($g_i$) in 3D. These antenna selection continually changes depending on the direction of the subarrays (or if there is motion in the room—deal with change of direction of signals. In one embodiment for example the optimization is not only for SNR, but also to take into account other interferes and to optimize for SINR in case of interference from, for example Neighbors' WiFi signals)

The process essentially finds a channel matrix for each permutation of states of antenna modules, so that the antenna beam patterns output from the antenna modules can change very fast during a symbol period if needed.

As shown in FIG. 4, the antenna modules 410 are managed by a controller 430 that keeps track of the states of the one or more antenna modules 410.

Thus, each antenna module 410 includes a hyper fast reconfigurable antenna array 412. The speed of reconfiguration is directly related to the bandwidth of a signal. In certain embodiments, X (to be discussed later) reconfigurations are required to be completed during the symbol period STS (if it is QAM modulated signal, as in the case for DVB-S2 standards) or period STO (1/bandwidth of OFDM signal as in the case of WiFi signal or flavors of 5G, Fifth Generation Wireless Network)

As shown in FIG. 5, the antenna module comprises a 2D rectangular array of identical antenna elements. Each module in an antenna system could have its own type of antenna elements. For example one antenna module could have square patch antenna elements, another antenna module can be composed of circular patch antenna elements.

As also shown in FIG. 5, each antenna element could be part of any one of 4 different linear subarrays. In this example each Antenna Element is subarrayed to its neighbors in 4 different ways. Different ways subarraying the antenna elements can accomplish different kinds of beam scanning.

The antenna elements 510 in the system 400 play a key role not only in capturing desired signal in an optimum way (from an electromagnetic (EM) wave propagation point of view), but also in rejecting interferences in the same frequency band or partially overlapping the same band in an optimal way (again from an EM propagation point of view). The propagation point of view means that the observation of wave vector in a short period of time from a particular direction in space. This observation includes not only the energy signature, direction of travel, but also polarity of the traveling EM wave. In this approach signals of different polarities during a symbol period can be differentiated.

As discussed above, once a wireless signal propagates in an indoor environment (whether it enters from outdoor to indoor, or it is generated in an indoor environment like a WiFi signal), because of the randomness of reflection/refraction of indoor environment (due to imposed boundary conditions), there would be a random shift in direction of the wave propagation (of the Poynting vector) as well as a random shift in polarization of traveling waves/signals. This random operator affects both the desired and undesired signals in a random way.

By dynamically shifting the polarization of antenna elements, beam scanning direction of the arrays, and coordination between antenna modules, beam scans of a specific set of 3D coordinates in the room from multiple points of view can be obtained, and hence the ability to resolve very complicated signal mixture otherwise not possible to resolve.

In order to accomplish that, each antenna element is capable of changing its polarity or preferred direction of surface current density distribution dynamically, for example, via switching, as discussed above. In FIG. 6, an antenna element is shown to have a plurality of ports. When one of the plurality of ports is active—meaning receiving wireless signal or EM energy, the other ports act as load impendence (active/passive or a combination) in such a way that the resultant current density is unique for that active port. In certain embodiments, the plurality of ports are dynamically activated. The observation time during which a particular port stays activated maybe about one wave cycle. For example for a 10 GHz signal, observation time of 0.1 nsec would be sufficient. The number of samples taken during an observation time can be set to, for example, a minimum of two samples per Nyquest Theory.

Figure 12:
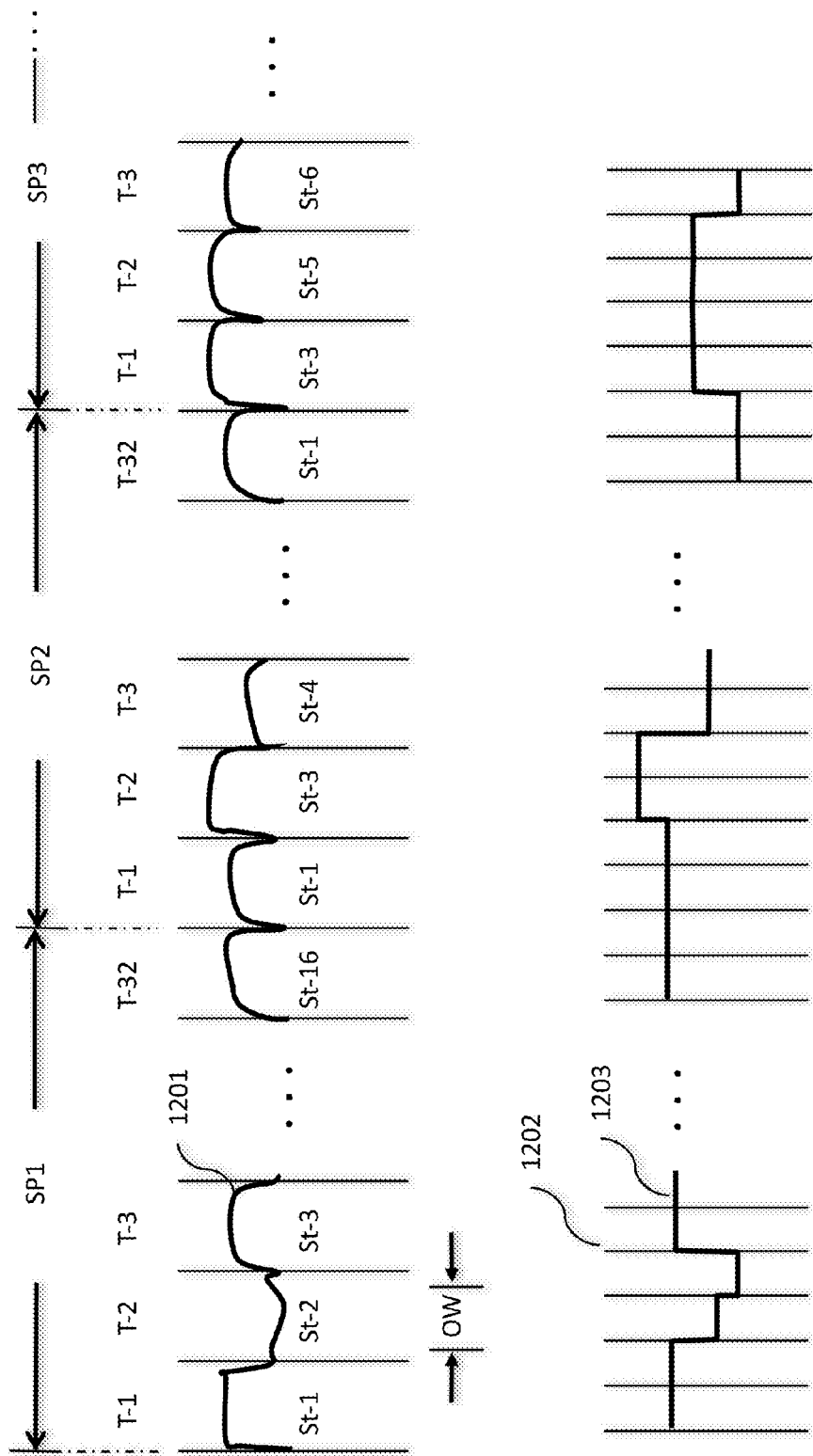
FIG. 12 is a representative diagram illustrating scanning of states of a antenna module and digital sampling of outputs of the antenna module according to certain embodiments

In certain embodiments, an Antenna Module 410 is programmed or controlled by the controller 430 to scan across its states by switching into each of a series of states in sequence. In the example shown in FIG. 5, there are 4 polarization, 4 subarray configurations, and thus 16 different states from the 16 unique combinations of polarization and subarray configuration. Each time that one of the states is being activated, there should be sufficient time for observation of the signals at the output of a selected subarray, and this observation time window can be made programmable. In certain embodiment, the observation time window can depend on the symbol period. For example, as shown in FIG. 12, the number of time slots during a symbol period (SP) can be programmed to be, for example, 32 so as to allow up to 32 new and independent observations be made for each Antenna Module scanning through a sequence of states St-1, St-2, . . . , etc., over time slots T-1, T-2, . . . , etc. So if the antenna system 400 has 10 antenna modules 410, the antenna system 400 is capable of 320 independent observations. What is really very powerful about this technology is that the processor 420 can figure out which one of those independent observations has best SNR or SINR, and for example by applying Greedy Algorithm. It can then order the controller 430 to reprogram the scan patterns to dedicate more observation time in system states that gives the best results.

Assume, for example, for QAM modulation, the symbol period is 30 nsec, with 24 nsec of useable time for observing an output 1201 from a subarray, then the observation window (OW) in which digital samples can be taken is equal to 24(nsec)/32=0.75 nsec. In the case of OFDM symbol, the inverse of equivalent bandwidth of the signal can be used. So, if for example, an OFDM symbol had an equivalent bandwidth of 40 MHz, then the observation period could be (1/40 MHz)/32=0.78125 nsec.

The output 1201 from each subarray is then fed to the ADC during each observation window, which samples the output 1201 at a series of sampling times 1202 to generate a digital stream 1203. The number of samples taken during the observation window varies from 2 (as shown in FIG. 12) to 8 and it is programmable. If for example 6 digital samples are collected during the observation window, then the ADS sampling rate would be =8G Samples/sec (8 giga samples per second). With this raw sample rate and with simple methods such as averaging, the output of the ADC for example can be reduced to 2 G Samples/sec.

In certain embodiments, the controller 430 receives feedback from the processor 420 such that if sampling a particular port of the antenna element does not yield good results (in the big scheme of optimal SINR), that port loses its turn to get sampled in the next round of sampling. For example, as shown in FIG. 12, the strength of signal output from the antenna module 410 at state St-2 is weak during symbol period SP1, so this state is skipped in the next round of scanning in, for example, symbol period SP2. Note that each time a port is sampled, the polarization out of that port may not be the same as at a previous sampling time, as in some cases the polarization might be linear, elliptical or circular.

As discussed above, in certain embodiments, each antenna module has two levels of reconfigurations. At level 1 of reconfiguration, each antenna element changes its field pattern (or polarization) in a very short period of time. At the end of the very short period of time, a level 2 reconfiguration can happen that selects a different subarray for summing and then sampling. The number of antenna elements, order of combining the level 1 and level 2 reconfiguration are all programmable by programming the controller 430, and the state sequence can be stored in memory of the switches in the Antenna Module. The changes happen at a very fast speed for antenna element reconfiguration. For example, for 4 types of level 1 reconfiguration and 4 types of level 2 reconfiguration, 16 different types results can be achieved from 4 spatial beams (or subarray group selection) and for each spatial beam a different field pattern/polarization).

So, in the above example, assuming a 0.15 nsec budget of settling time for each time slot, then all the switchings between one state to another should happen in 0.15 nsec. This means that speed for the antenna module to reconfigure from one state to another should be about 150 psec. So the configuration of the antenna module need to change fast to allow each configuration or state to last for a time corresponding to a few wavelengths, long enough so at least one wavelength is observed at a particular state/configuration.

Figure 13:
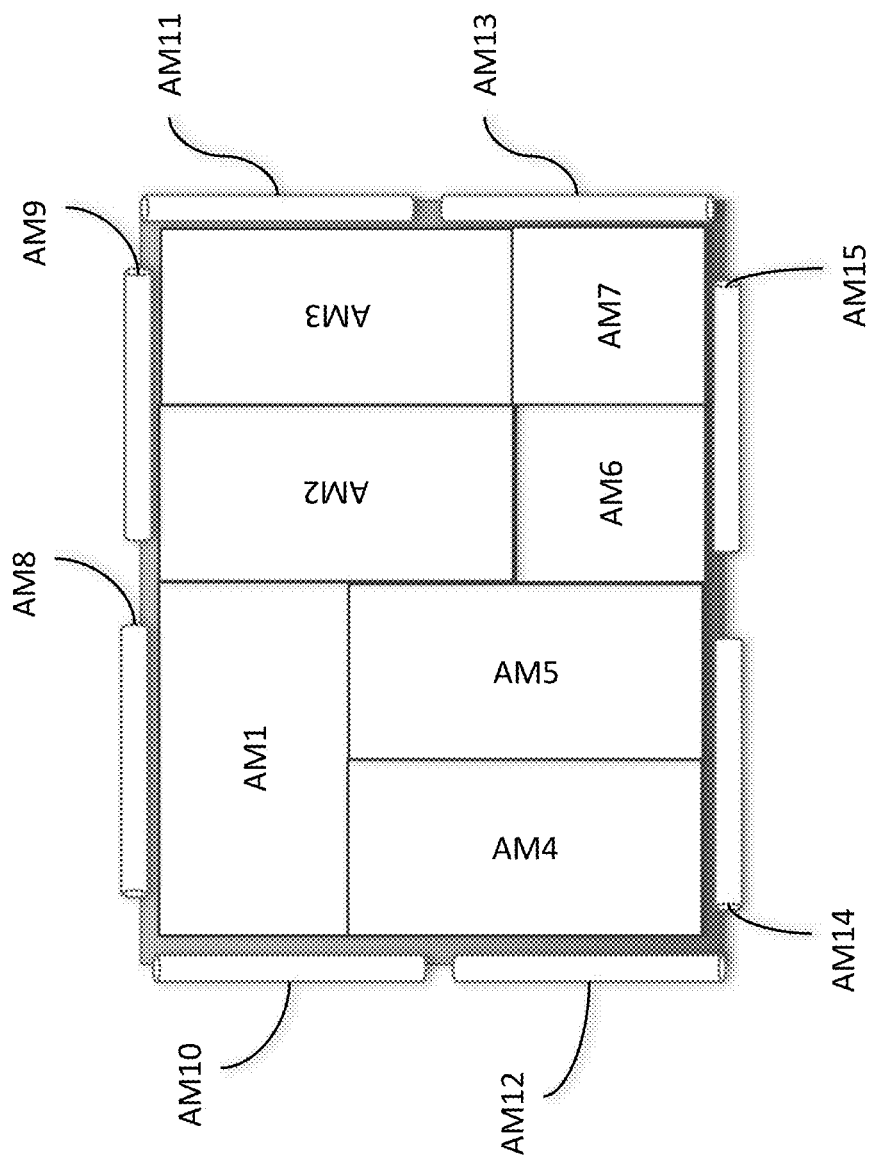
FIG. 13 is a block diagram illustrating a multi-module antenna system according to certain embodiments.

The antenna system 400 can thus include multiple antenna modules that work collaboratively to find and rank energy density distribution within a 3D indoor environment on a very fast time scale—i.e. order of symbol period. If the environment is fairly stationary, the observation period can be increased to span across multiple symbol periods. In certain embodiments, the multiple antenna modules can have various shapes and sizes. For example, as shown in FIG. 13, the multiple antenna modules may include rectangular shaped antenna modules AW1 through AW 7 in different sizes and orientations and placed either together or in different locations of a house or room. The multiple antenna modules may also include cylindrical shaped antenna modules AW8 through AW 15 in different sizes and orientations and placed either together with the rectangular shaped antenna modules or with each other or in different locations of a house or room.

Figure 14:
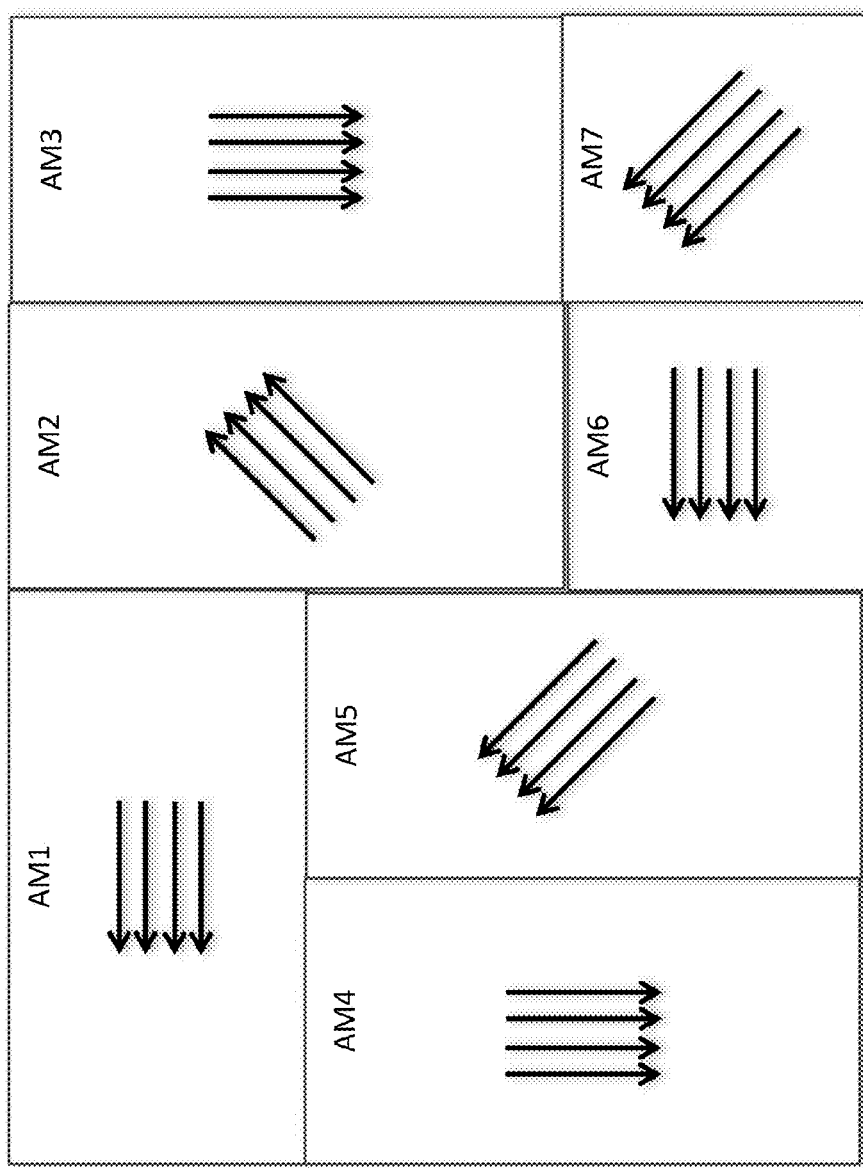
FIG. 14 is a representative diagram illustrating different polarities in the multi-module antenna system at one instant of time according to certain embodiments.

In certain embodiments, each Antenna module is programmed to run a specific scanning pattern (polarization+ configuration). The scanning pattern is adaptive and is managed by a controller 430. The time slot (T-1, T-2, . . . ) each antenna module spends in a particular configuration or state (ST) is managed by the central controller 430 as well. Also, different scanning patterns for scanning across the states/configurations may be used for different antenna modules. Thus, the antenna modules at any give time may have different polarizations, as shown in FIG. 14.

For the sake of simplicity, in the pervious example, an antenna module is described as having 16 different states or 16 different configurations (4 polarization configurations*4 selections of subarray groups). The number of states can be higher (e.g., 10 times of 16 or more) if irregular shapes or random shapes of antenna modules, antenna arrays or antenna patches are used, in order to scan an entire room. At each state, an antenna module points to a coordinate in space with a particular field pattern. The output of each sub-array is digitized and sent into the process 420, such as a Central Petabit Processor (CPP), as shown in FIG. 4.

The processor 420 can make a number of decisions on how to treat each stream of digitized signal. In certain embodiments, the processor is configured to obtain maximum achievable SINR (signal-to-interference-plus-noise-ratio or signal power divided by interference and noise power), as defined by the limits of information theory minus the information gap due to imperfect implementation, as to achieve a gain of at least 30 dB for the output signal, and more preferably at least 50 dB, in order to provide a signal quality similar to the quality required by, for example, the DVB-S Standard or DVB-S2 Standard. For example, the processor 420 is configured (or programmed) to perform the following processes:

(1) Determine if there is sufficient SNR in each signal stream for decoding purposes. Note at any instant of time and during, for example, a 750 psec time slot or interval, each antenna module sends out a set of digital data stream corresponding to a particular state of the antenna module. Note that the number of the signal streams in the set depends on the configuration of the sub-arrays in the antenna module at the particular state.

(2) The CP makes a quick power estimate of the stream and then ranks the powers for a given spatial coordinates and configuration.

(3) If there is not sufficient SNR in a particular stream—then adjacent streams maybe combined in certain algorithmic way like overlap and shift to build a stream with sufficient SNR.

(4) If SNR is high enough, but not decodable due to interference, then the corresponding coordinates or the state of antenna module are recorded.

(5) Next, cooperative algorithm among multiple antenna modules, is activated. The cooperative algorithm is designed to simultaneously scan a same region of space from the multiple modules at the same time. The beam-forming/ scanning can be real-time or done off-line. The reprocessing can be repeated synthetically from inputs from different groups of sub-arrays.

(6) In step (5), information is gathered to decompose the multipath components and Angles of Arrival (AoA) for all the desired and undesired signals at the same time. The approach to resolve the ambiguity could be based on a number of possible iterative techniques, such as the Expectation Maximization (EM) (for example see IEEE 802.11n specifications, or iterative adaptive equalization.

(7) By performing (6) and (7), Channel State Information in time, space, and polarization can be obtained. The information in time is needed because the receive channel property due to highly dynamic property of the antennas is quite chaotic in time. The antenna dispersion properties due to mutual interference between antenna elements should also be measured and calibrated ahead of time. The impulse response is antenna state dependent and the dispersion may continue over instants of sampling time (8) Once channel state information for a 3D system is completed only the ones with highest energy are kept. This can be accomplished using Singular Value Decomposition (SVD) or similar matrix manipulation methods for each unique antenna system state. The goal of each channel state could be slightly different if SNR is too low or if SINR is too low.

(9) With the channel information, the channel matrix can be reconstructed using methods such Maximal Ratio Combining (MRC) or Optimal Combining to achieved maximum or optimum combined SINR that is be fed to a QAM (or OFDM) decoder to demodulate.

(10) The output the QAM decoder is the digital payload corresponding to the incoming signal. One type of digital payload is an MPEG stream that carries TV signals.

Another modification to Step (9) is to separately soft decode each data stream and then use Dynamic Programming algorithm to jointly decode the combined data streams. An example of Dynamic Programming is Viterbi decoding.

What is claimed is:

1. An indoor antenna system for receiving an incoming signal originated from a satellite, the indoor antenna system comprising:

a first antenna module, the first antenna module including a first array of antenna elements, the first array of antenna elements including a plurality of subarrays, wherein each antenna element in the first array of antenna elements is capable of providing a first output with any of a first plurality of polarities, wherein the first antenna module is capable of reacting to the incoming signal in any of a first plurality of states by generating a set of digitized outputs, each respective state of the first plurality of states corresponding to a respective combination of a particular polarity of the first plurality of polarities and a particular subarray of the plurality of subarrays selected to contribute to the set of digitized outputs;

a first controller communicatively coupled to the first antenna module to cause the first antenna module to change its state over a series of observation time periods, wherein a number of time slots within a symbol period of the incoming signal is set to allow the first antenna module to scan across at least a selected subset of the first plurality of states, and wherein the first antenna module outputs a first number of digital signal streams during the series of observation time periods; and a processor communicatively coupled to the first controller for generating an output signal using the first number of digital signal streams.

2. The indoor antenna system of claim 1, wherein each antenna element in the first array of antenna elements is capable of providing an output with any of the first plurality of polarities, and wherein the first antenna module further includes a first plurality of combiners and a first converter, wherein each respective combiner of the first plurality of combiners is capable of combining outputs from a respective subarray in the first array of antenna elements, wherein the first converter is capable of sampling and digitizing signals from a selected subset of one or more combiners, and wherein the selected subset of one or more combiners is capable of combining outputs from a respective group of one or more subarrays, each of the one or more subarrays having a common array direction.

3. The indoor antenna system of claim 2, wherein each respective combiner is coupled to the respective subarray via a respective selector that selects outputs with a particular polarity from antenna elements in the respective subarray, the selector being controlled by the first controller to change its selection according to a pre-programmed scanning pattern.

4. The indoor antenna system of claim 2, wherein the first converter is coupled to the first plurality of combiners via a selector that selects a particular subset of the first plurality of combiners, the selector being controlled by the first controller to change its selection according to a pre-programmed scanning pattern.

5. The indoor antenna system of claim 2, wherein the processor is programmed to instruct the first controller to modify a scanning pattern of the first antenna module based on digitization samples of signals received from the first converter over a period of time.

6. The indoor antenna system of claim 2, further comprising:
a second antenna module, the second antenna module including a second array of antenna elements, a second plurality of combiners, and a second converter, wherein each antenna element in the second array of antenna elements is capable of providing a second output with any of a second plurality of polarities, wherein each respective combiner of the second plurality of combiners is capable of combining outputs from a respective subarray in the second array of antenna elements, wherein the second antenna module is capable of being in any of a second plurality of states to receive the incoming signal, each respective state of the second plurality of states corresponding to a respective polarity of the second plurality of polarities and a respective subset of one or more combiners in the second plurality of combiners selected to provide one or more outputs associated with the respective polarity of the second plurality of polarities to the second converter, wherein the second converter is capable of converting the one or more outputs from the respective subset of one or more combiners in the second plurality of combiners into digitized sample signals of the second antenna module; and
a second controller for controlling the second antenna module by causing the second antenna module to scan across at least some of the second plurality of states, wherein the second antenna module changes its state over the series of observation time periods and outputs a second number of digital signal streams during the series of observation time periods;
wherein the processor is capable of generating the output signal using the first number of digital signal streams and the second number of digital signal streams.

7. The indoor antenna system of claim 6, wherein the second converter is the same as the first converter.

8. The indoor antenna system of claim 6, wherein the second controller is the same as the first controller.

9. The indoor antenna system of claim 6, wherein an antenna element in the second array of antenna elements has a different shape than an antenna element in the first array of antenna elements.

10. The indoor antenna system of claim 1, wherein the first array of antenna elements forms a panel that is substantially flat.

11. A method of receiving an incoming signal, comprising:
causing a first antenna module to change its state over a series of observation time periods, wherein a number of time slots within a symbol period of the incoming signal is set to allow the first antenna module to scan across at least a selected subset of a first plurality of states, and wherein the first antenna module outputs a first number of digital signal streams during the series of observation time periods, the first antenna module including a first array of antenna elements, a first plurality of combiners, and a first converter, wherein each antenna element in the first array of antenna elements is capable of providing a first output with any of a first plurality of polarities, wherein each respective combiner of the first plurality of combiners combines outputs from a respective subarray in the first array of antenna elements, wherein the first antenna module is in any of the first plurality of states to receive the incoming signal, each respective state of the first plurality of states corresponding to a respective polarity of the first plurality of polarities and a respective set of one or more combiners of the first plurality of combiners selected to provide one or more outputs associated with the respective polarity to the first converter, wherein the first converter converts the outputs from the respective set of one or more combiners into digitized sample signals of the first antenna module, wherein a pre-programmed first scanning pattern has a first scan cycle selected based on a symbol period associated with the incoming signal; and
generating an output signal corresponding to the input signal using the digitized sample signals collected over a predetermined time period, the output signal having a gain of 30 dB with respect to the incoming signal.

12. The method of claim 11, wherein the respective set of one or more combiners combines outputs from a respective group of one or more subarrays, each of the one or more subarrays having a common array direction.

13. The method of claim 11, further comprising selecting outputs with a particular polarity from antenna elements in the respective subarray for combining by each respective combiner according to a pre-programmed scanning pattern.

14. The method of claim 11, further comprising selecting a particular subset of the first plurality of combiners according to a pre-programmed scanning pattern.

15. The method of claim 11, further comprising modifying a scanning pattern of the first antenna module based on digitized sample signals received from the first converter over a period of time.

16. The method of claim 11, further comprising:
causing a second antenna module to change its state over the series of observation time periods, wherein the second antenna module outputs a second number of digital signal streams during the series of observation time periods, the second antenna module including a second array of antenna elements, a second plurality of combiners, and a second converter, wherein each antenna element in the second array of antenna elements is capable of providing a second output with any of a second plurality of polarities, wherein each respective combiner of the second plurality of combiners combines outputs from a respective subarray in the second array of antenna elements, wherein the second antenna module is capable of being in any of a second plurality of states to receive the incoming signal, each respective state of the second plurality of states corresponding to a respective polarity of the second plurality of polarities and a respective subset of one or more combiners in the second plurality of combiners selected to provide one or more outputs associated with the respective polarity of the second plurality of polarities to the second converter, wherein the second converter is capable of converting the one or more outputs from the respective subset of one or more combiners in the second plurality of combiners into digitized sample signals of the second antenna module, wherein a second scanning pattern of the second antenna module has a second scan cycle less than a symbol period associated with the incoming signal, the second scanning pattern being different from the first scanning pattern;

wherein the output signal is generated using both first digitized sample signals and second digitized sample signals collected over the predetermined time period.

17. The method of claim 16, wherein the second converter is the same as the first converter.

18. The method of claim 16, further comprising modifying at least one of the first scanning pattern and the second scanning pattern based on digitized sample signals from both the first antenna module and the second antenna module.

19. The method of claim 16, wherein an antenna element in the second array of antenna elements has a different shape than an antenna element in the first array of antenna elements.

20. The method of claim 11, wherein the first array of antenna elements forms a panel that is substantially flat.

* * * * *